United States Patent
Syu

(10) Patent No.: US 9,721,515 B2
(45) Date of Patent: Aug. 1, 2017

(54) LIQUID CRYSTAL DISPLAY PANEL AND GRAYSCALE VOLTAGE COMPENSATING METHOD THEREOF

(71) Applicant: Shenzhen China Star Optoelectronics Technology Co., Ltd., Shenzhen, Guangdong (CN)

(72) Inventor: Shen-sian Syu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 257 days.

(21) Appl. No.: 14/433,617

(22) PCT Filed: Nov. 28, 2014

(86) PCT No.: PCT/CN2014/092509
§ 371 (c)(1),
(2) Date: Apr. 3, 2015

(87) PCT Pub. No.: WO2016/078114
PCT Pub. Date: May 26, 2016

(65) Prior Publication Data
US 2016/0343317 A1    Nov. 24, 2016

(30) Foreign Application Priority Data
Nov. 21, 2014 (CN) .......................... 2014 1 0677455

(51) Int. Cl.
*G09G 3/36* (2006.01)
*G02F 1/133* (2006.01)

(52) U.S. Cl.
CPC .......... *G09G 3/3614* (2013.01); *G02F 1/133* (2013.01); *G09G 3/36* (2013.01); *G09G 3/3648* (2013.01);
(Continued)

(58) Field of Classification Search
CPC .............. G09G 3/3614; G09G 3/3655; G09G 2320/0233
(Continued)

(56) References Cited

U.S. PATENT DOCUMENTS 6,166,714 A * 12/2000 Kishimoto ........... G09G 3/3655
345/209
6,492,970 B1  12/2002 Furuhashi et al.
(Continued)

FOREIGN PATENT DOCUMENTS

CN    102005185 A    4/2011
CN    102024440 A    4/2011
(Continued)

*Primary Examiner* — Koosha Sharifi-Tafreshi
(74) *Attorney, Agent, or Firm* — Andrew C. Cheng

(57) ABSTRACT

A liquid crystal display panel and a grayscale voltage compensating method thereof are provided. The compensating method includes: obtaining an actual voltage distribution of a common voltage on a common electrode; and compensating positive polarity grayscale voltages as well as negative polarity grayscale voltages of respective pixel electrodes according to the actual voltage distribution to make that: for a same grayscale value, a difference value between the compensated positive polarity grayscale voltage of each pixel electrode and the common voltage on an opposing position of the pixel electrode on the common electrode is equal to a difference value between the compensated negative polarity grayscale voltage of the pixel electrode and the common voltage on the opposing position. By the above method, the invention can eliminate the flicker phenomenon when the liquid crystal display panel is displaying and therefore the display effect is improved.

6 Claims, 4 Drawing Sheets

(52) U.S. Cl.
CPC ............... *G09G 2300/0426* (2013.01); *G09G 2320/0233* (2013.01); *G09G 2320/0247* (2013.01); *G09G 2320/0276* (2013.01)

(58) Field of Classification Search
USPC .............................................. 345/89, 87, 96
See application file for complete search history.

(56) References Cited

U.S. PATENT DOCUMENTS

| | | | |
|---|---|---|---|
| 2006/0132415 A1* | 6/2006 | Yu ........................ | G09G 3/3655 345/98 |
| 2009/0322799 A1 | 12/2009 | Guo et al. | |
| 2011/0221760 A1* | 9/2011 | Irie ...................... | G09G 3/3648 345/589 |
| 2015/0116373 A1* | 4/2015 | Kim .................... | G09G 3/3614 345/690 |

FOREIGN PATENT DOCUMENTS

| | | |
|---|---|---|
| CN | 103943088 A | 7/2014 |
| CN | 1632647 A | 6/2015 |
| JP | 2004287113 A | 10/2004 |
| KR | 101363680 B1 | 2/2014 |

\* cited by examiner

LIQUID CRYSTAL DISPLAY PANEL AND GRAYSCALE VOLTAGE COMPENSATING METHOD THEREOF

TECHNICAL FIELD

The invention relates to the field of liquid crystal display technology and concretely relates to the field of driving voltage, and more particularly to a liquid crystal display panel and a grayscale voltage compensating method thereof.

DESCRIPTION OF RELATED ART

With the increasing maturity of optoelectronic display technology, the liquid crystal display panel has become the most widely used flat panel display device. In order to ensure the normal display of a display image of the liquid crystal display panel, the display of a pixel grayscale is achieved by using a voltage difference between a common voltage and a grayscale voltage and uses different voltage differences to represent different grayscales. Moreover, in order to prevent the liquid crystal molecules from being polarized, the grayscale voltage needs to alternate its positive and negative polarities for driving in an alternating current manner.

However, for the liquid crystal display panel, due to the uneven manufacturing process and different loads at different positions, the uniformity of the common electrode (V-com) is poor, resulting in an uneven voltage difference between positive polarity as well as negative polarity grayscale voltages and the common voltage. For example, in a same grayscale direction, the farther away from the center of the display panel, the larger the voltage difference is, so that a flicker phenomenon would occurs when reversing the positive polarity and negative polarity grayscale voltages, the display effect of the liquid crystal display panel is degraded.

SUMMARY

Accordingly, a technical problem to be solved by the invention is to provide a liquid crystal display panel and a grayscale voltage compensating method, which can eliminate the flicker phenomenon occurred when the liquid crystal display panel is displaying and improve the display effect.

In order to solve the technical problem, a technical solution proposed by the invention is to provide a grayscale voltage compensating method of a liquid crystal display panel. The liquid crystal display panel uses an alternating current driving manner and includes a common electrode and a plurality of pixel electrodes disposed opposite to the common electrode. The common electrode is applied with a common voltage, and the plurality of pixel electrodes are each applied with grayscale voltages corresponding to a grayscale value, the grayscale voltages comprises a positive polarity grayscale voltage and a negative polarity grayscale voltage. The grayscale voltage compensating method includes: obtaining an actual voltage distribution of the common voltage on the common electrode, wherein the step of obtaining an actual voltage distribution of the common voltage on the common electrode comprises: selecting a base position point on the common electrode, adjusting the common voltage on the base position point and the positive polarity grayscale voltage as well as the negative polarity grayscale voltage on a base pixel electrode opposite to the base position point to obtain an optimal common voltage, an optimal positive polarity grayscale voltage and an optimal positive grayscale voltage corresponding to the base pixel electrode, and determining actual voltage values of the common voltage on other position points except for the base position point when the common voltage on the base position point is the optimal common voltage; and compensating the positive polarity grayscale voltage and the negative polarity grayscale voltage of each of the pixel electrodes according to the actual voltage distribution to thereby make that: for the same grayscale value, a difference value between the compensated positive polarity grayscale voltage on the pixel electrode and the common voltage on an opposing position of the pixel electrode on the common electrode is equal to a difference value between the compensated negative polarity grayscale voltage and the common voltage on the opposing position, wherein the step of compensating the positive polarity grayscale voltage and the negative polarity grayscale voltage of each of the pixel electrodes according to the actual voltage distribution comprises: compensating the optimal positive polarity grayscale voltage and the optimal negative polarity grayscale voltage according to the actual voltage values of the common voltage on opposing positions of the other pixel electrodes in the plurality of pixel electrodes except for the base pixel electrode on the common electrode to obtain the compensated positive polarity grayscale voltages and the compensated negative polarity grayscale voltages of the other pixel electrodes.

In an embodiment, the step of obtaining an actual voltage distribution of the common voltage on the common electrode further includes: determining a voltage distribution function varying with coordinates of the common voltage on the common electrode according to the actual voltage values. The step of compensating the optimal positive polarity grayscale voltage and the optimal negative polarity grayscale voltage according to the actual voltage values of the common voltage on opposing positions of the other pixel electrodes in the plurality of pixel electrodes except for the base pixel electrode on the common electrode includes: calculating actual voltage values of the common voltage on the opposing positions according to the voltage distribution function and coordinates of the opposing positions of the other pixel electrodes on the common electrode; calculating grayscale voltage compensation values of the other pixel electrodes according to the calculated actual voltage values; and compensating the optimal positive polarity grayscale voltage and the optimal negative polarity grayscale voltage according to the grayscale voltage compensation values to thereby obtain the compensated positive polarity grayscale voltages and the compensated negative polarity grayscale voltages of the other pixel electrodes.

In an embodiment, the voltage distribution function is a Gaussian function.

In order to solve the above technical problem, another technical solution proposed by the invention is to provide a grayscale voltage compensating method of a liquid crystal display panel. The liquid crystal display panel includes a common electrode and a plurality of pixel electrodes disposed opposite to the common electrode. the common electrode is applied with a common voltage, the plurality of pixel electrodes are each applied with grayscale voltages corresponding to a grayscale value, the grayscale voltages includes a positive polarity grayscale voltage and a negative polarity grayscale voltage. The grayscale voltage compensating method includes: obtaining an actual voltage distribution of the common voltage on the common electrode; and compensating the positive polarity grayscale voltage and the negative polarity grayscale voltage of each of the plurality of pixel electrodes according to the actual voltage distribution to make that: for the same grayscale value, a difference value between the compensated positive polarity grayscale voltage on the pixel electrode and the common voltage on an opposing position of the pixel electrode on the common electrode is equal to a difference value between the compensated negative polarity grayscale voltage on the pixel electrode and the common voltage on the opposing position.

In an embodiment, the step of obtaining an actual voltage distribution of the common voltage on the common electrode includes: selecting a base position point on the common electrode; adjusting the common voltage on the base position point and the positive polarity grayscale voltage as well as the negative polarity grayscale voltage of a base pixel electrode disposed opposite to the base position point to obtain an optimal common voltage, an optimal positive polarity grayscale voltage and an optimal negative polarity grayscale voltage corresponding to the base pixel electrode; and determining actual voltage values of the common voltage on other position points except for the base position point when the common voltage on the base position point is the optimal common voltage. The step of compensating the positive polarity grayscale voltage and the negative polarity grayscale voltage of each of the plurality of pixel electrodes according to the actual voltage distribution includes: compensating the optimal positive polarity grayscale voltage and the optimal negative polarity grayscale voltage according to the actual voltage values of the common voltage on the opposing positions of the other pixel electrodes in the plurality of pixel electrodes except for the base pixel electrode on the common electrode to thereby obtain the compensated positive polarity grayscale voltages and the compensated negative polarity grayscale voltages of the other pixel electrodes.

In an embodiment, the step of obtaining an actual voltage distribution of the common voltage on the common electrode further includes: determining a voltage distribution function varying with coordinates of the common voltage on the common electrode according to the actual voltage values. The step of compensating the optimal positive polarity grayscale voltage and the optimal negative polarity grayscale voltage according to the actual voltage values of the common voltages on the opposing positions of the other pixel electrodes in the plurality of pixel electrodes except for the base pixel electrode on the common electrode includes: calculating actual voltage values of the common voltage on the opposing positions according to the voltage distribution function and coordinates of the opposing positions of the other pixel electrodes on the common electrode; calculating grayscale voltage compensation values of the other pixel electrodes according to the calculated actual voltage values; and compensating the optimal positive polarity grayscale voltage and the optimal negative polarity grayscale voltage according to the grayscale voltage compensation values to obtain the compensated positive polarity grayscale voltages and the compensated negative polarity grayscale voltages of the other pixel electrodes.

In an embodiment, the voltage distribution function is a Gaussian function.

In an embodiment, the step of obtaining an actual voltage distribution of the common voltage on the common electrode further includes: calculating grayscale voltage compensation values of the other pixel electrodes according to the actual voltage values of the common voltage on the opposing positions of the other pixel electrodes on the common electrode; and storing the grayscale voltage compensation values in a lookup table form. The step of compensating the optimal positive polarity grayscale voltage and the optimal negative polarity grayscale voltage according to the actual voltage values of the common voltage on the opposing positions of the other pixel electrodes in the plurality of pixel electrodes except for the base pixel electrode on the common electrode includes: looking up the grayscale voltage compensation values of the other pixel electrodes from the lookup table; and compensating the optimal positive polarity grayscale voltage and the optimal negative polarity grayscale voltage according to the grayscale voltage compensation values to obtain the compensated positive polarity grayscale voltages and the compensated negative polarity grayscale voltages of the other pixel electrodes.

In an embodiment, the step of storing the grayscale voltage compensation values in a lookup table form includes: averaging the grayscale voltage compensation values of a plurality of neighboring pixel electrodes in the other pixel electrodes to obtain an average grayscale voltage compensation value; and storing the average grayscale voltage compensation value in a lookup table form. The step of compensating the optimal positive polarity grayscale voltage and the optimal negative polarity grayscale voltage according to the grayscale voltage compensation values includes: using the average grayscale voltage compensation value to compensate the optimal positive polarity grayscale voltage and the optimal negative grayscale voltage to thereby obtain the compensated positive polarity grayscale voltages and the compensated negative polarity grayscale voltages of the plurality of neighboring pixel electrodes.

In order to solve the above technical problem, still another technical solution proposed by the invention is to provide a liquid crystal display panel. The liquid crystal display panel includes a common electrode and a plurality of pixel electrodes disposed opposite to the common electrode. The common electrode is adapted for being applied with a common voltage. The plurality of pixel electrodes are each adapted for being applied with grayscale voltages corresponding to a grayscale value, the grayscale voltages include a positive polarity grayscale voltage and a negative polarity grayscale voltage. The liquid crystal display panel further includes: a storage device configured (i.e., structured and arranged) for storing data of an actual voltage distribution of the common voltage on the common electrode; and a grayscale voltage compensator configured for compensating the positive polarity grayscale voltage and the negative polarity grayscale voltage of each of the plurality of pixel electrodes according to the actual voltage distribution to make that: for the same grayscale value, a difference value between the compensated positive polarity grayscale voltage on the pixel electrode and the common voltage on an opposing position of the pixel electrode on the common electrode is equal to a difference value between the compensated negative polarity grayscale voltage on the pixel electrode and the common voltage on the opposing position.

In an embodiment, the storage device is configured for storing a voltage distribution function varying with coordinates of the common voltage on the common electrode. The grayscale voltage compensator is configured for calculating actual voltage values on the opposing positions of the common voltage according to the voltage distribution function and coordinates of the opposing positions of the plurality of pixel electrodes on the common electrode, calculating grayscale voltage compensation values of the plurality of pixel electrodes according to the actual voltage values, and compensating the positive polarity grayscale voltages and the negative polarity grayscale voltages of the plurality of pixel electrodes according to the grayscale voltage compensation values.

In an embodiment, the storage device is configured for storing a lookup table, and the lookup table contains calculated grayscale voltage compensation values corresponding to the plurality of pixel electrodes according to the actual voltage distribution. The grayscale voltage compensator is configured for looking up the grayscale voltage compensation values of the plurality of pixel electrode from the lookup table, and compensating the positive polarity grayscale voltages and the negative polarity grayscale voltages of the plurality of pixel electrodes according to the grayscale voltage compensation values.

In an embodiment, the lookup table contains an average grayscale voltage compensation value obtained by averaging the grayscale voltage compensation values of a plurality of neighboring pixel electrodes. The grayscale voltage compensator is configured for compensating the positive polarity grayscale voltages and the negative polarity grayscale voltages of the plurality of neighboring pixel electrodes according to the average grayscale voltage compensation value.

By the above technical solution, the efficacy of the invention is that: the embodiments of the invention each compensate positive polarity grayscale voltages as well as negative polarity grayscale voltages of respective pixel electrodes according to actual voltage distribution on the common electrode, such that: for a same grayscale value, a difference value between the compensated positive polarity grayscale voltage of each pixel electrode and the common voltage on an opposing position of the pixel electrode on the common electrode is equal to a difference value between the compensated negative polarity grayscale voltage of the pixel electrode and the common voltage on the opposing position. As a result, the flicker phenomenon occurred when the liquid crystal display panel is displaying can be eliminated and the display effect is improved.

BRIEF DESCRIPTION OF THE DRAWINGS

In order to more clearly illustrate the technical solutions of various embodiments of the present invention, drawings will be used in the description of embodiments will be given a brief description below. Apparently, the drawings in the following description only are some embodiments of the invention, the ordinary skill in the art can obtain other drawings according to these illustrated drawings without creative effort. In the drawings.

DETAILED DESCRIPTION OF EMBODIMENTS

In the following, with reference to accompanying drawings of embodiments of the invention, technical solutions in the embodiments of the invention will be clearly and completely described. Apparently, the embodiments of the invention described below only are a part of embodiments of the invention, but not all embodiments. Based on the described embodiments of the invention, all other embodiments obtained by ordinary skill in the art without creative effort belong to the scope of protection of the invention.

Figure 1:
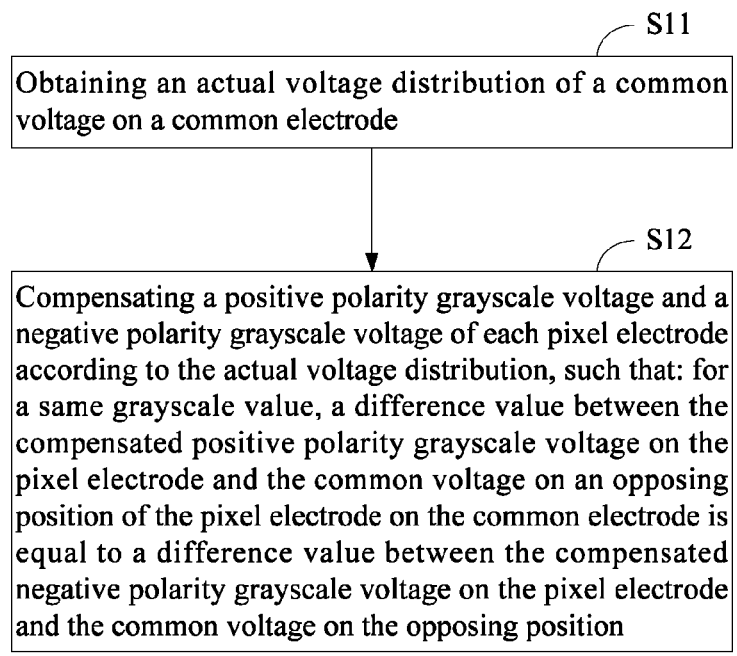
FIG. 1 is a flowchart of a grayscale voltage compensating method of a first embodiment of the invention.
Figure 2:
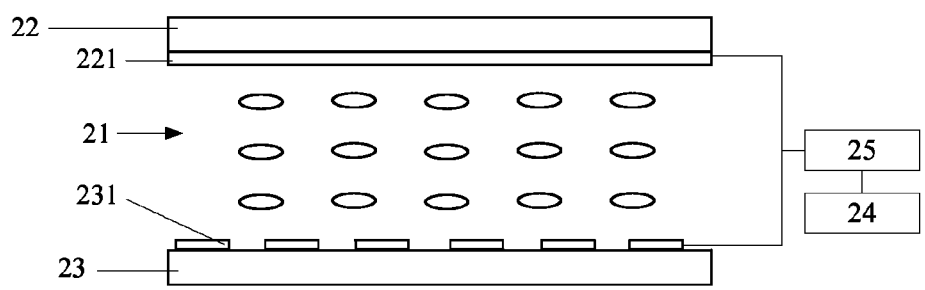
FIG. 2 is a structural sectional view of a liquid crystal display panel of a preferred embodiment of the invention.

Firstly, the invention provides a grayscale voltage compensating method of a first embodiment as shown in FIG. 1 for compensating grayscale voltages of a liquid crystal display panel 20 employing an alternating current (AC) driving manner as shown in FIG. 2. As shown in FIG. 2, the liquid crystal display panel 20 includes a liquid crystal layer 21, a common electrode 221 disposed on a color filter substrate 22 and multiple (i.e., more than one) pixel electrodes 231 disposed on an array substrate 23. The common electrode 221 and the multiple pixel electrodes 231 are oppositely disposed. The common electrode 221 is adapted for being applied with a common voltage. The multiple pixel electrodes 231 are each adapted for being applied with grayscale voltages. Based on that the grayscale voltages include a positive polarity grayscale voltage and a negative polarity grayscale voltage, the compensation for the grayscale voltages is the compensation for the positive polarity grayscale voltages as well as the negative polarity grayscale voltages.

Referring to FIG. 1 and FIG. 2 together, the grayscale voltage compensating method in this embodiment includes following steps S11 and S12.

Step S11: obtaining an actual voltage distribution of a common voltage on the common electrode 221.

Step S12: compensating the positive polarity grayscale voltage and the negative polarity grayscale voltage of each of the pixel electrodes 231 according to the actual voltage distribution, such that: for a same grayscale value, a difference value between the compensated positive polarity grayscale voltage on the pixel electrode 231 and the common voltage on an opposing position of the pixel electrode 231 on the common electrode 221 is equal to a difference value between the compensated negative polarity grayscale voltage on the pixel electrode 231 and the common voltage on the opposing position.

Because the compensated positive polarity grayscale voltage and the negative polarity grayscale voltage of each pixel electrode have equal difference values with respect to the common voltage on the opposing position for a same grayscale value, the flicker phenomenon would not occur when the liquid crystal display panel 20 correspondingly displays the grayscale, and therefore the display effect is improved.

Figure 3:
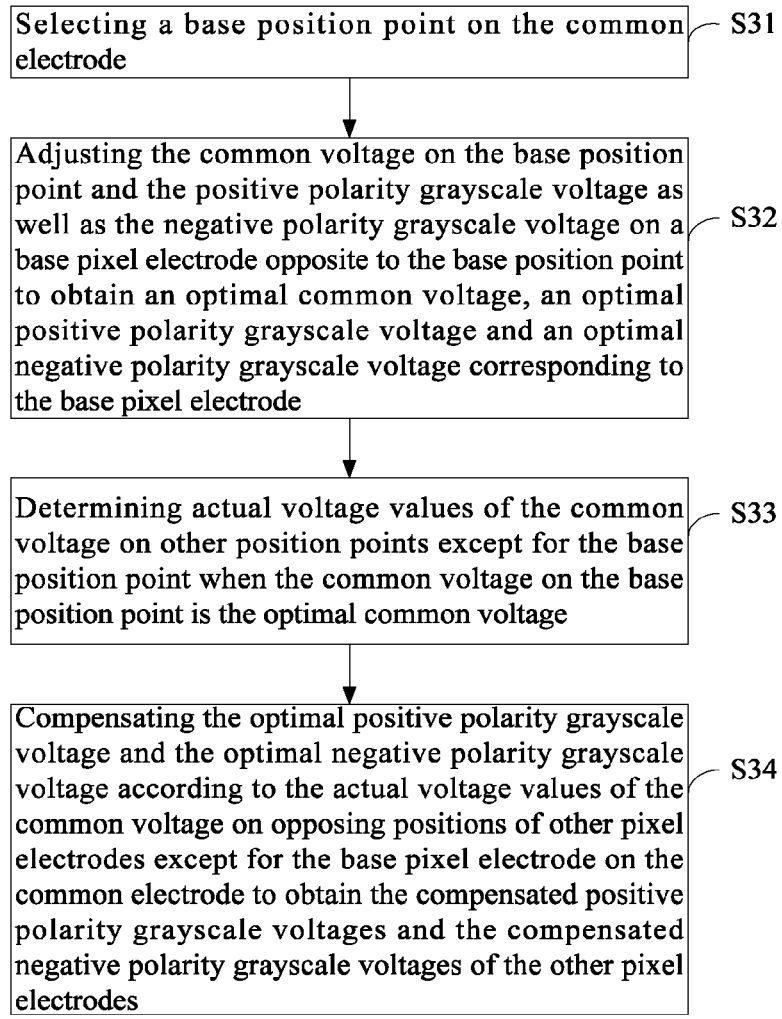
FIG. 3 is a flowchart of a grayscale voltage compensating method of a second embodiment of the invention.

Secondly, the invention provides a grayscale voltage compensating method of a second embodiment as shown in FIG. 3, and will be described on the basis of the first embodiment. In particular, steps S31~S33 and step S34 are corresponding to the step S11 and the step S12 of the first embodiment. A difference is that: the second embodiment selects a position point in a same grayscale direction as a base position point and uses a difference value between a positive polarity grayscale voltage as well as a negative polarity grayscale voltage and a common voltage corresponding to the base position point as a reference value to perform grayscale voltage compensations for other position points except for the base position point in the same grayscale direction.

Referring to FIG. 3, the grayscale voltage compensating method in this embodiment includes the following steps S31~S34.

Step S31: selecting a base position point O on the common electrode 221

Figure 4:
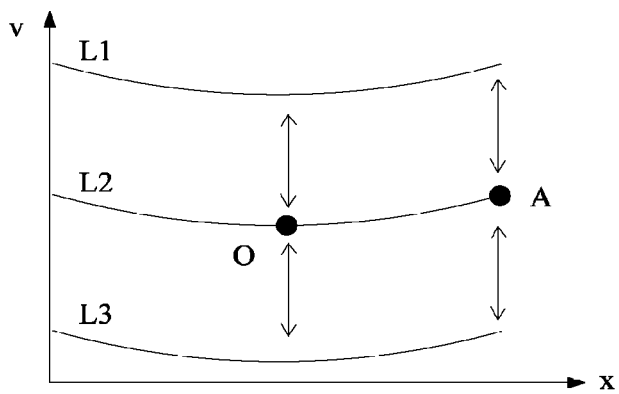
FIG. 4 is a schematic diagram of a relationship between common voltages and positive polarity as well as negative polarity grayscale voltages in a same grayscale direction and position coordinates corresponding to pixel electrodes of the invention.

In conjunction with the illustration of FIG. 4, the horizontal axis represents a position point coordinate x on the common electrode 221 in a same grayscale direction, the vertical axis represents a voltage v, the curve L1 represents compensated positive polarity grayscale voltages, the curve L2 represents common voltage values on the common electrode 221, and the curve L3 represents compensated negative polarity grayscale voltages. For a same grayscale value, preferably, a central point of the common electrode 221 along a grayscale direction corresponding to the grayscale value is used as the base position point O.

Step S32: adjusting a common voltage on the base position point O and a positive polarity grayscale voltage as well as a negative polarity grayscale voltage on a base pixel electrode opposite to the base position point O to obtain an optimal common voltage, an optimal positive polarity grayscale voltage and an optimal negative polarity grayscale voltage corresponding to the base pixel electrode.

When the liquid crystal display panel 20 is displaying, a grayscale value corresponding to the base position point O is optimal, and grayscale voltages of the base pixel electrode opposite to the base position point O are the optimal positive polarity grayscale voltage and the optimal negative polarity grayscale voltage.

Step S33: determining actual voltage values of the common voltage on other position points except for the base position point when the common voltage on the base position point is the optimal common voltage.

Step S34: compensating the optimal positive polarity grayscale voltage and the optimal positive polarity grayscale voltage according to the actual voltage values of the common voltage on opposing positions of the other pixel electrodes except for the base pixel electrode on the common electrode 221, to obtain compensated positive polarity grayscale voltages and compensated negative polarity grayscale voltages of the other pixel electrodes.

As shown in FIG. 4, for example, the optimal common voltage is $\Delta V_{p1}$, the optimal positive polarity grayscale voltage is $\Delta V_{p2}$ and the negative polarity grayscale voltage is $\Delta V_{p3}$ for the base position point O, the actual voltage value of the common voltage on other position point A is $\Delta V_{p4}$, the difference value between the optimal positive polarity grayscale voltage $\Delta V_{p2}$ and the optimal common voltage $\Delta V_{p1}$ on the base position point O is equal to the difference value between the negative polarity grayscale voltage $\Delta V_{p3}$ and the optimal common voltage $\Delta V_{p1}$, i.e., $\Delta V_{p2} - \Delta V_{p1} = \Delta V_{p3} - \Delta V_{p1}$.

The optimal positive polarity grayscale voltage $\Delta V_{p2}$ is increased or decreased with a compensation voltage $C_p(x)$ to obtain the compensated positive polarity grayscale voltage for the position point A, and the optimal negative polarity grayscale voltage $\Delta V_{p3}$ is increased or decreased with a compensation voltage $C_n(x)$ to obtain the compensated negative polarity grayscale voltage for the position point A, and further make the compensated positive polarity and negative polarity grayscale voltages to satisfy that $\Delta V_{p2} \pm C_p(x) - \Delta V_{p4} = \Delta V_{p3} \pm C_n(x) - \Delta V_{p4}$.

Figure 5:
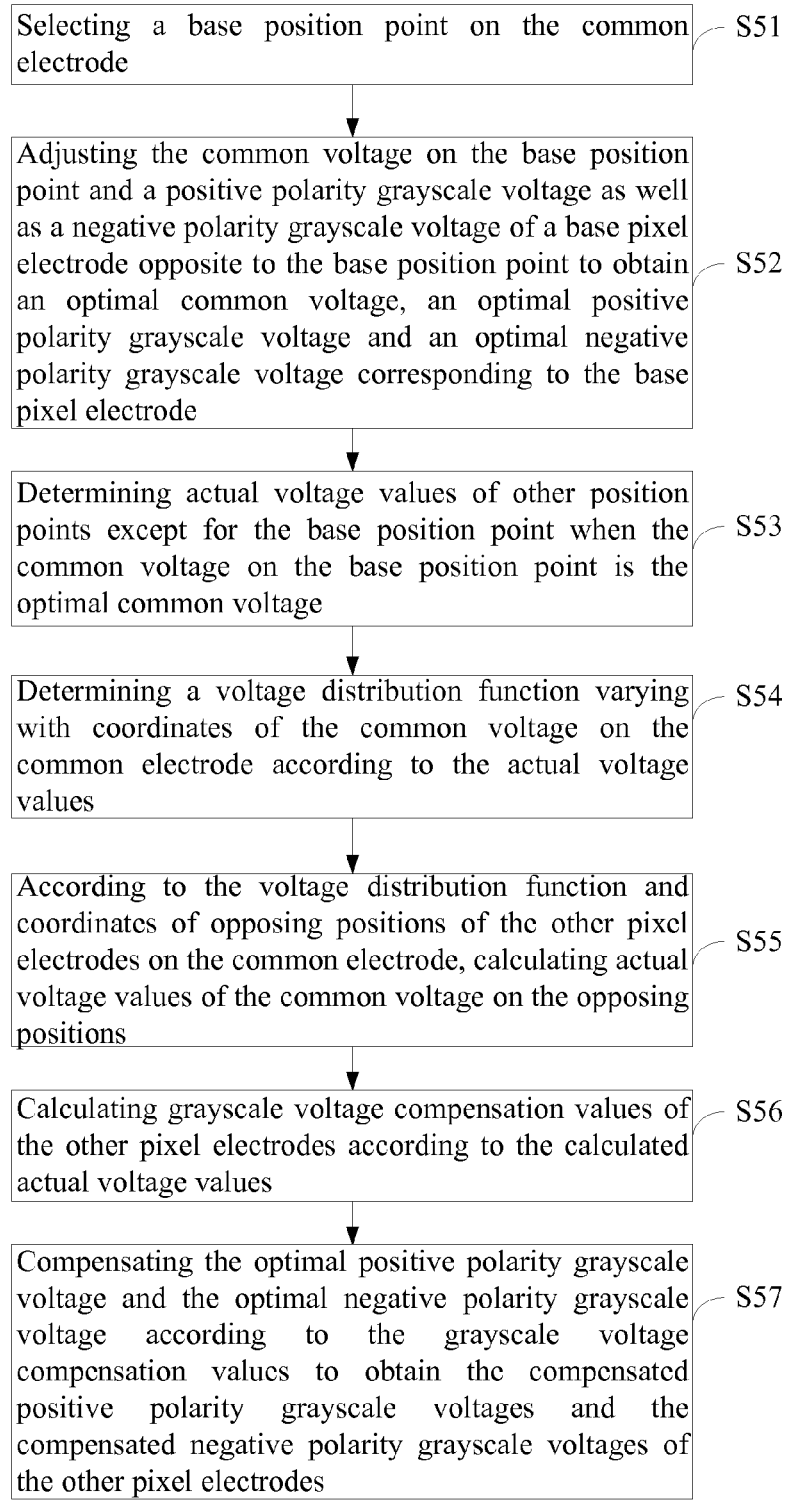
FIG. 5 is a flowchart of a grayscale voltage compensating method of a third embodiment of the invention.

In order to calculate the compensation voltage $C_p(x)$ and the compensation voltage $C_n(x)$, the invention further provides a grayscale voltage compensation method of a third embodiment as shown in FIG. 5 and will be described on the basis of the second embodiment, which is suitable for the situation of a voltage distribution function varying with coordinates of the common voltage on the common electrode 221 being a Gaussian function.

Referring to FIG. 5, the grayscale voltage compensating method in this embodiment includes following steps S51~S57.

Step S51: selecting a base position point O on the common electrode 221.

Step S52: adjusting a common voltage on the base position point O and a positive polarity grayscale voltage as well as a negative polarity grayscale voltage on a base pixel electrode opposite to the base position point O to obtain an optimal common voltage, an optimal positive polarity grayscale voltage and a negative polarity grayscale voltage corresponding to the base pixel electrode.

Step S53: determining actual voltage values of the common voltage on other position points except for the base position point when the common voltage on the base position point O is the optimal common voltage.

Step S54: determining a voltage distribution function varying with coordinates of the common voltage on the common electrode 221 according to the actual voltage values.

Step S55: according to the voltage distribution function and coordinates of opposing positions of the other pixel electrodes on the common electrode 221, calculating actual voltage values of the common voltage on the opposing positions.

Step S56: calculating grayscale voltage compensation values of the other pixel electrodes according to the calculated actual voltage values.

Step S57: compensating the optimal positive polarity grayscale voltage and the optimal negative polarity grayscale voltage according to the grayscale voltage compensation values to obtain the compensated positive polarity grayscale voltages and the compensated negative polarity grayscale voltages of the other pixel electrodes.

It is assumed that, for a same grayscale value, $V_p(x)$ represents a positive polarity grayscale voltage, $V_n(x)$ represents a negative polarity grayscale voltage, $C_p(x)$ represents a compensation voltage for the positive polarity grayscale voltage, $C_n(x)$ represents a compensation voltage for the negative polarity grayscale voltage, $V'_p(x)$ represents the compensated positive polarity grayscale voltage, $V'_n(x)$ represents the compensated negative polarity grayscale voltage, and x represents a coordinate of any position point (including the base position point O and position points corresponding to other pixel electrodes) along the grayscale direction, an expression 5-1 and an expression 5-2 associated with before compensation and after compensation can be obtained as follows:

$$V_p(x) + C_p(x) = V'_p(x) \quad \text{Expression 5-1}$$

$$V_n(x) + C_n(x) = V'_n(x) \quad \text{Expression 5-2}$$

In order to maintain display brightnesses of a same position point to be the same, i.e., the compensation voltage for the positive polarity grayscale voltage is equal to the compensation voltage for the negative polarity grayscale voltage, an expression 5-3 can be obtained as follows:

$$C_p(x) = C_n(x) = \frac{c(x)}{2} \quad \text{Expression 5-3}$$

where C(x) represents an assumed constant.

In conjunction with the expression 5-1, the expression 5-2 and the expression 5-3, an expression 5-4 can be obtained as follows:

$$C(x) = 2V_{com}(x) - [V_p(x) + V_n(x)] \qquad \text{Expression 5-4}$$

When the voltage distribution function varying with coordinates of the common voltage on the common electrode 221 is a Gaussian function, an optimal common voltage corresponding to the pixel electrode 231 on each position point is distributed as a Gaussian function with respect to the optimal common voltage corresponding to the pixel electrode 231 on the base position point O. Based on this, an expression 5-5 can be obtained as follows according to Gaussian function:

$$V_{com}(x) = V_{com}(\mu) + A \times \frac{1}{\sqrt{2\pi}\,\sigma}\left\{1 - \left[\exp\left(-\left(\frac{(x-\mu)^2}{2\sigma^2}\right)\right)\right]\right\} \qquad \text{Equation 5-5}$$

where $\mu$ represents a coordinate of the base position point O along a grayscale direction, $V_{com}(x)$ represents a common voltage at the coordinate x, $V_{com}(\mu)$ represents a common voltage at the coordinate $\mu$, $\sigma$ represents a Gaussian distribution value and determined according to characteristics of the liquid crystal display panel 20, A is a Gaussian coefficient.

In conjunction with the expression 5-5 and the expression 5-4, an expression 5-6 can be obtained as follows:

$$C(x) = \qquad \text{Expression 5-6}$$
$$2\left\{V_{com}(\mu) + A \times \frac{1}{\sqrt{2\pi}\,\sigma}\left\{1 - \left[\exp\left(-\left(\frac{(x-\mu)^2}{2\sigma^2}\right)\right)\right]\right\}\right\} - [V_p(x) + V_n(x)]$$

In conjunction with the expression 5-6 and the expression 5-3, the compensation voltage $C_p(x)$ for the positive polarity grayscale voltage and the compensation voltage $C_n(x)$ for the negative polarity grayscale voltage corresponding to the pixel electrode 231 at any position point x can be obtained.

Figure 6:
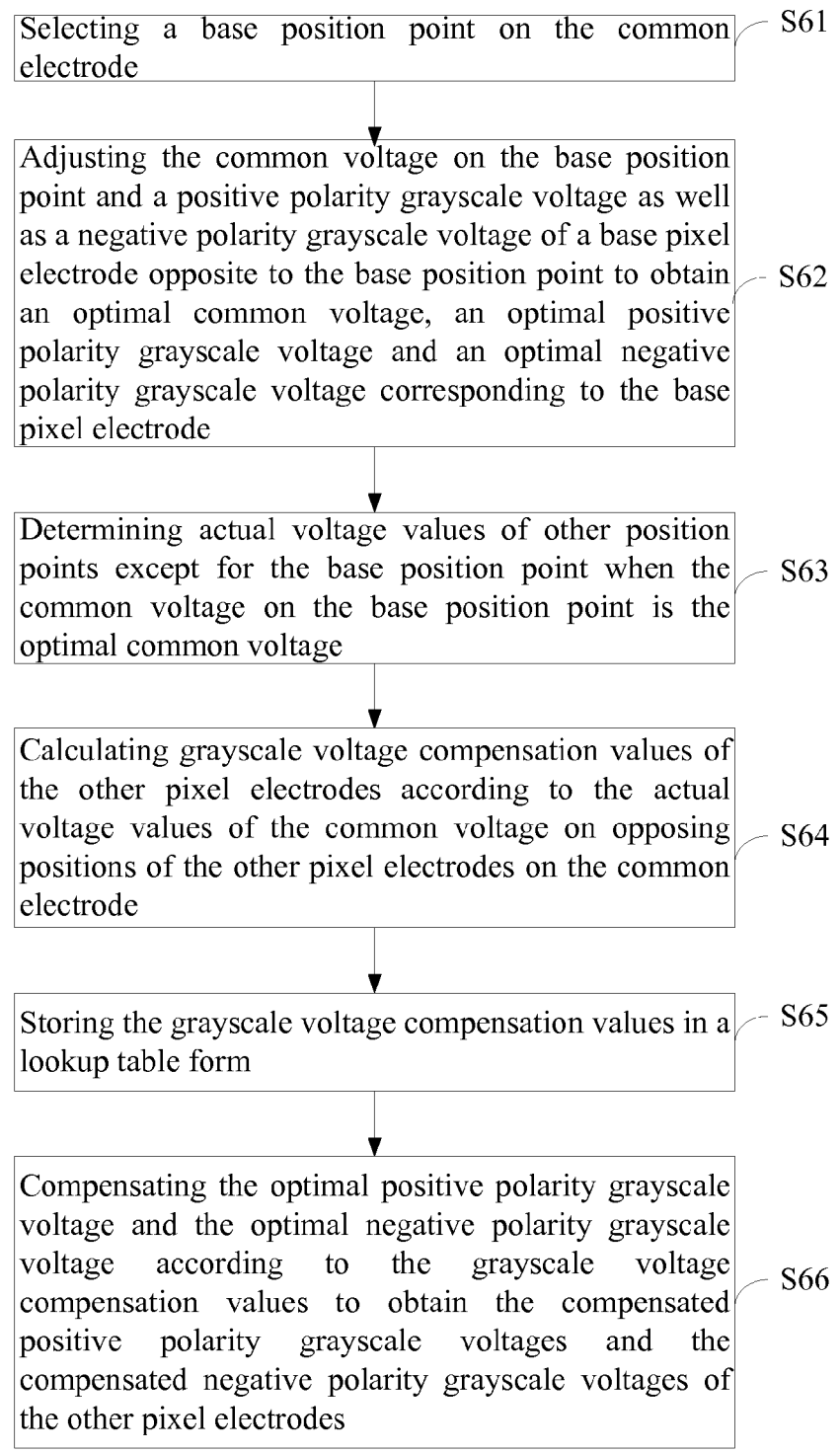
FIG. 6 is a flowchart of a grayscale voltage compensating method of a fourth embodiment of the invention.

When the voltage distribution function varying with coordinates of the common voltage on the common electrode 221 is not a Gaussian function, the invention further provides a grayscale voltage compensating method of a fourth embodiment as shown in FIG. 6 and will be described on the basis of the second embodiment, so as to obtain a compensation voltage $C_p(x)$ for positive polarity grayscale voltage and a compensation voltage $C_n(x)$ for negative polarity grayscale voltage.

Referring to FIG. 6, the grayscale voltage compensating method in this embodiment includes following steps S61~S66.

Step S61: selecting a base position point O on the common electrode 221.

Step S62: adjusting a common voltage on the base position point O and a positive polarity grayscale voltage as well as a negative polarity grayscale voltage on a base pixel electrode opposite to the base position point O, to obtain an optimal common voltage, an optimal positive polarity grayscale voltage and an optimal negative polarity grayscale voltage corresponding to the base pixel electrode.

Step S63: determining actual voltage values of the common voltage on other position points except for the base position point O when the common voltage on the base position point O is the optimal common voltage.

Step S64: calculating grayscale voltage compensation values of the other pixel electrodes according to the actual voltage values of the common voltage on opposing positions of the other pixel electrodes on the common electrode 221.

Step S65: storing the grayscale voltage compensation values in a lookup table form.

In this embodiment, preferably, the grayscale voltage compensation values of multiple neighboring pixel electrodes 231 in the other pixel electrodes are averaged to obtain an average grayscale voltage compensation value and then the average grayscale voltage compensation value is stored in a lookup table form.

Specifically, in conjunction with the expression 5-1 through the expression 5-4, if there is N number of any position points x (corresponding to pixel electrodes 231) in the grayscale direction, the grayscale voltage compensation values of k number of pixel electrodes 231 are averaged, and the obtained average grayscale voltage compensation value satisfies an expression 6-1 as follows:

$$C\begin{pmatrix} x_1 \\ \vdots \\ x_j \end{pmatrix}_{N/k} = \qquad \text{Expression 6-1}$$

$$\frac{1}{k}\sum_{i=1}^{k}\left\{2V_{com}\begin{pmatrix} x_1 \\ \vdots \\ x_{i\times j} \end{pmatrix} - \left[V_p\begin{pmatrix} x_1 \\ \vdots \\ x_{i\times j} \end{pmatrix} + V_n\begin{pmatrix} x_1 \\ \vdots \\ x_{i\times j} \end{pmatrix}\right]\right\}$$

where $$j = 1, 2 \ldots \frac{N}{k}$$

Step S66: compensating the optimal positive polarity grayscale voltage and the optimal negative polarity grayscale voltage according to the grayscale voltage compensation values to obtain the compensated positive polarity grayscale voltages and the compensated negative polarity grayscale voltages of the other pixel electrodes.

This embodiment uses the average grayscale voltage compensation value to compensate the optimal positive polarity grayscale voltage and the optimal polarity grayscale voltage to thereby obtain the compensated positive polarity grayscale voltages as well as compensated negative polarity grayscale voltages of multiple (i.e., more than one) neighboring pixel electrodes 231.

According to the expression 6-1, the expression 6-2 satisfied by the compensated positive polarity grayscale voltages and the expression 6-3 satisfied by the compensated negative polarity grayscale voltages can be obtained as follows:

$$V_p\begin{pmatrix} x_1 \\ \vdots \\ x_{i\times j} \end{pmatrix} + C_p\begin{pmatrix} x_1 \\ \vdots \\ x_j \end{pmatrix} = V'_p\begin{pmatrix} x_1 \\ \vdots \\ x_{i\times j} \end{pmatrix} \qquad \text{Expression 6-2}$$

$$V_n\begin{pmatrix} x_1 \\ \vdots \\ x_{i\times j} \end{pmatrix} + C_n\begin{pmatrix} x_1 \\ \vdots \\ x_j \end{pmatrix} = V'_n\begin{pmatrix} x_1 \\ \vdots \\ x_{i\times j} \end{pmatrix} \qquad \text{Expression 6-3}$$

It should be indicated that when the grayscale voltage compensating method in this embodiment stores the grayscale voltage compensation values in lookup table form, it can reduce the inquiry amount/number of pixel electrodes 231 corresponding to compensated positive polarity grayscale voltages as well as compensated negative polarity grayscale voltages.

The invention finally provides a liquid crystal display panel. Referring to FIG. 2 again, the liquid crystal display panel 20 further includes a storage device 24 and a grayscale voltage compensator 25. The storage device 24 is configured (i.e., structured and arranged) for storing data of an actual voltage distribution of the common voltage on the common electrode 221. The grayscale compensator 25 is configured for compensating positive polarity grayscale voltages as well as negative polarity grayscale voltages of respective pixel electrodes 231 according to the actual voltage distribution.

When the compensating method of the third embodiment as shown in FIG. 5 is performed, the storage device 24 stores a voltage distribution function varying with coordinates of the common voltage on the common electrode 221, the grayscale voltage compensator 25 calculates actual voltage values of the common voltage on opposing positions of respective pixel electrodes 231 on the common electrode 221 based on the voltage distribution function and coordinates of the opposing positions 231 of the respective pixel electrodes 231 on the common electrode 221 and calculates grayscale voltage compensation values of the respective pixel electrodes 231 according to the calculated actual voltage values, and further compensates positive polarity grayscale voltages as well as negative polarity grayscale voltages of the respective pixel electrodes 231 according to the grayscale voltage compensation values.

When the compensating method of the fourth embodiment as shown in FIG. 6 is performed, the storage device 24 stores the lookup table. The lookup table contains calculated grayscale voltage compensation values corresponding to respective pixel electrodes 231 according to the actual voltage distribution. Preferably, the lookup table contains an average grayscale voltage compensation value obtained by averaging the grayscale voltage compensation values of multiple neighboring pixel electrodes 231.

The grayscale voltage compensator 25 looks up the grayscale voltage compensation values of the respective pixel electrode 231 from the lookup table and further compensates positive polarity grayscale voltages as well as negative polarity grayscale voltages of the respective pixel electrodes 231 according to the grayscale voltage compensation values. Preferably, the grayscale voltage compensator 25 compensates the positive polarity grayscale voltages as well as the negative polarity grayscale voltages of multiple neighboring pixel electrodes 231 according to the average grayscale voltage compensation value.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A grayscale voltage compensating method of a liquid crystal display panel, wherein the liquid crystal display panel uses an alternating current driving manner and comprises a common electrode and a plurality of pixel electrodes disposed opposite to the common electrode, the common electrode is applied with a common voltage, and the plurality of pixel electrodes are each applied with grayscale voltages corresponding to a grayscale value, the grayscale voltages comprises a positive polarity grayscale voltage and a negative polarity grayscale voltage; the grayscale voltage compensating method comprises:

obtaining an actual voltage distribution of the common voltage on the common electrode, wherein the step of obtaining an actual voltage distribution of the common voltage on the common electrode comprises: selecting a base position point on the common electrode, adjusting the common voltage on the base position point and the positive polarity grayscale voltage as well as the negative polarity grayscale voltage on a base pixel electrode opposite to the base position point to obtain an optimal common voltage, an optimal positive polarity grayscale voltage and an optimal positive grayscale voltage corresponding to the base pixel electrode, and determining actual voltage values of the common voltage on other position points except for the base position point when the common voltage on the base position point is the optimal common voltage;

compensating the positive polarity grayscale voltage and the negative polarity grayscale voltage of each of the pixel electrodes according to the actual voltage distribution, wherein for the same grayscale value, a difference value between the compensated positive polarity grayscale voltage on the pixel electrode and the common voltage on an opposing position of the pixel electrode on the common electrode is equal to a difference value between the compensated negative polarity grayscale voltage and the common voltage on the opposing position; and wherein the step of compensating the positive polarity grayscale voltage and the negative polarity grayscale voltage of each of the pixel electrodes according to the actual voltage distribution comprises: compensating the optimal positive polarity grayscale voltage and the optimal negative polarity grayscale voltage according to the actual voltage values of the common voltage on opposing positions of the other pixel electrodes in the plurality of pixel electrodes except for the base pixel electrode on the common electrode to obtain the compensated positive polarity grayscale voltages and the compensated negative polarity grayscale voltages of the other pixel electrodes.

2. The grayscale voltage compensating method as claimed in claim 1, wherein the step of obtaining an actual voltage distribution of the common voltage on the common electrode further comprises:
determining a voltage distribution function varying with coordinates of the common voltage on the common electrode according to the actual voltage values;

wherein the step of compensating the optimal positive polarity grayscale voltage and the optimal negative polarity grayscale voltage according to the actual voltage values of the common voltage on opposing positions of the other pixel electrodes in the plurality of pixel electrodes except for the base pixel electrode on the common electrode comprises:
calculating actual voltage values of the common voltage on the opposing positions according to the voltage distribution function and coordinates of the opposing positions of the other pixel electrodes on the common electrode;
calculating grayscale voltage compensation values of the other pixel electrodes according to the calculated actual voltage values;

compensating the optimal positive polarity grayscale voltage and the optimal negative polarity grayscale voltage according to the grayscale voltage compensation values to thereby obtain the compensated positive polarity grayscale voltages and the compensated negative polarity grayscale voltages of the other pixel electrodes.

3. The grayscale voltage compensating method as claimed in claim 2, wherein the voltage distribution function is a Gaussian function.

4. A grayscale voltage compensating method of a liquid crystal display panel, wherein the liquid crystal display panel comprises a common electrode and a plurality of pixel electrodes disposed opposite to the common electrode, the common electrode is applied with a common voltage, the plurality of pixel electrodes are each applied with grayscale voltages corresponding to a grayscale value, the grayscale voltages comprises a positive polarity grayscale voltage and a negative polarity grayscale voltage; the grayscale voltage compensating method comprises:

obtaining an actual voltage distribution of the common voltage on the common electrode;

compensating the positive polarity grayscale voltage and the negative polarity grayscale voltage of each of the plurality of pixel electrodes according to the actual voltage distribution, wherein for the same grayscale value, a difference value between the compensated positive polarity grayscale voltage on the pixel electrode and the common voltage on an opposing position of the pixel electrode on the common electrode is equal to a difference value between the compensated negative polarity grayscale voltage on the pixel electrode and the common voltage on the opposing position;

wherein the step of obtaining an actual voltage distribution of the common voltage on the common electrode comprises:

selecting a base position point on the common electrode;

adjusting the common voltage on the base position point and the positive polarity grayscale voltage as well as the negative polarity grayscale voltage of a base pixel electrode disposed opposite to the base position point to obtain an optimal common voltage, an optimal positive polarity grayscale voltage and an optimal negative polarity grayscale voltage corresponding to the base pixel electrode;

determining actual voltage values of the common voltage on other position points except for the base position point when the common voltage on the base position point is the optimal common voltage;

wherein the step of compensating the positive polarity grayscale voltage and the negative polarity grayscale voltage of each of the plurality of pixel electrodes according to the actual voltage distribution comprises:

compensating the optimal positive polarity grayscale voltage and the optimal negative polarity grayscale voltage according to the actual voltage values of the common voltage on the opposing positions of the other pixel electrodes in the plurality of pixel electrodes except for the base pixel electrode on the common electrode to thereby obtain the compensated positive polarity grayscale voltages and the compensated negative polarity grayscale voltages of the other pixel electrodes;

wherein the step of obtaining an actual voltage distribution of the common voltage on the common electrode further comprises:

calculating grayscale voltage compensation values of the other pixel electrodes according to the actual voltage values of the common voltage on the opposing positions of the other pixel electrodes on the common electrode;

storing the grayscale voltage compensation values in a lookup table form;

wherein the step of compensating the optimal positive polarity grayscale voltage and the optimal negative polarity grayscale voltage according to the actual voltage values of the common voltage on the opposing positions of the other pixel electrodes in the plurality of pixel electrodes except for the base pixel electrode on the common electrode comprises:

looking up the grayscale voltage compensation values of the other pixel electrodes from the lookup table;

compensating the optimal positive polarity grayscale voltage and the optimal negative polarity grayscale voltage according to the grayscale voltage compensation values to obtain the compensated positive polarity grayscale voltages and the compensated negative polarity grayscale voltages of the other pixel electrodes.

5. The grayscale voltage compensating method as claimed in claim 4, wherein the step of storing the grayscale voltage compensation values in a lookup table form comprises:

averaging the grayscale voltage compensation values of a plurality of neighboring pixel electrodes in the other pixel electrodes to obtain an average grayscale voltage compensation value;

storing the average grayscale voltage compensation value in a lookup table form;

wherein the step of compensating the optimal positive polarity grayscale voltage and the optimal negative polarity grayscale voltage according to the grayscale voltage compensation values comprises:

using the average grayscale voltage compensation value to compensate the optimal positive polarity grayscale voltage and the optimal negative grayscale voltage to thereby obtain the compensated positive polarity grayscale voltages and the compensated negative polarity grayscale voltages of the plurality of neighboring pixel electrodes.

6. A liquid crystal display panel comprising a common electrode and a plurality of pixel electrodes disposed opposite to the common electrode, the common electrode being adapted for being applied with a common voltage, the plurality of pixel electrodes being each adapted for being applied with grayscale voltages corresponding to a grayscale value, the grayscale voltages comprising a positive polarity grayscale voltage and a negative polarity grayscale voltage; the liquid crystal display panel further comprising:

a storage device, configured for storing data of an actual voltage distribution of the common voltage on the common electrode;

a grayscale voltage compensator, configured for compensating the positive polarity grayscale voltage and the negative polarity grayscale voltage of each of the plurality of pixel electrodes according to the actual voltage distribution, wherein for the same grayscale value, a difference value between the compensated positive polarity grayscale voltage on the pixel electrode and the common voltage on an opposing position of the pixel electrode on the common electrode is equal to a difference value between the compensated negative polarity grayscale voltage on the pixel electrode and the common voltage on the opposing position;

wherein the storage device is configured for storing a lookup table, the lookup table contains calculated grayscale voltage compensation values corresponding to the plurality of pixel electrodes according to the actual voltage distribution; the grayscale voltage compensator is configured for looking up the grayscale voltage compensation values of the plurality of pixel electrode from the lookup table, and compensating the positive polarity grayscale voltages and the negative polarity grayscale voltages of the plurality of pixel electrodes according to the grayscale voltage compensation values;

wherein the lookup table contains an average grayscale voltage compensation value obtained by averaging the grayscale voltage compensation values of a plurality of neighboring pixel electrodes; the grayscale voltage compensator is configured for compensating the positive polarity grayscale voltages and the negative polarity grayscale voltages of the plurality of neighboring pixel electrodes according to the average grayscale voltage compensation value.

\* \* \* \* \*